(12) United States Patent
Goodnight et al.

(10) Patent No.: US 6,553,302 B2
(45) Date of Patent: Apr. 22, 2003

(54) WORK VEHICLE WITH OPERATOR SELECTED LOAD CONTROL AND FUEL ECONOMY CONTROL

(75) Inventors: Trent Lynn Goodnight, Hudson, IA (US); Timothy Joel Kilworth, Waverly, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/903,183

(22) Filed: Jul. 11, 2001

(65) Prior Publication Data

US 2002/0010534 A1 Jan. 24, 2002

Related U.S. Application Data

(60) Provisional application No. 60/217,808, filed on Jul. 12, 2000.

(51) Int. Cl.[7] .............................................. B60K 41/00
(52) U.S. Cl. ........................... 701/54; 701/50; 701/52; 477/107; 477/108; 477/109; 477/110; 172/3; 172/7; 172/9
(58) Field of Search ............................. 701/50, 52, 54; 477/107, 108, 109, 110; 172/3, 7, 9

(56) References Cited

U.S. PATENT DOCUMENTS

| 4,208,925 A | | 6/1980 | Miller et al. |
|---|---|---|---|
| 4,425,620 A | | 1/1984 | Batcheller et al. |
| 4,669,335 A | | 6/1987 | Matsuoka et al. |
| 4,715,012 A | | 12/1987 | Mueller , Jr. |
| 4,740,898 A | | 4/1988 | McKee et al. |
| 4,777,848 A | | 10/1988 | Taga et al. |
| 4,846,283 A | * | 7/1989 | Batcheller ..................... 172/10 |
| 5,233,525 A | * | 8/1993 | Overmann et al. ......... 477/123 |
| 5,333,479 A | * | 8/1994 | Yamamoto et al. ............ 172/3 |
| 5,406,483 A | | 4/1995 | Kallis et al. |
| 5,410,476 A | | 4/1995 | Iizuka |
| 5,515,927 A | * | 5/1996 | Matsushita et al. ............ 172/3 |
| 5,830,097 A | * | 11/1998 | Larkin .......................... 475/72 |
| 5,845,224 A | * | 12/1998 | McKee ........................ 477/78 |
| 6,003,396 A | * | 12/1999 | Bellinger et al. ........... 477/120 |

* cited by examiner

Primary Examiner—William A Cuchlinski, Jr.

(57) ABSTRACT

A work vehicle such as an agricultural tractor includes means for the operator to select between manual or automatic engine speed control and to select among multiple automatic modes each having a different amount by which the engine speed is reduced when the load is reduced and the transmission is up-shifted to maintain the vehicle ground speed. This enables the operator to match the degree of engine speed reduction to the particular task at hand for improved performance and productivity. Preferably, the transmission is an infinitely variable transmission whereby the engine speed and the transmission can both be varied infinitely.

17 Claims, 1 Drawing Sheet

WORK VEHICLE WITH OPERATOR SELECTED LOAD CONTROL AND FUEL ECONOMY CONTROL

This application claims the benefit of provisional application No. 60/217,808, filed Jul. 12, 2000.

BACKGROUND AND SUMMARY OF THE INVENTION

1. Field of the Invention

The present invention relates to a work vehicle such as an agricultural tractor having an infinitely variable transmission and an operator actuated selector switch for selecting between manual or automatic engine speed control wherein in the automatic mode, the electronic controller will automatically up shift the transmission and reduce the engine speed to maintain the desired vehicle speed and reduce fuel consumption when the load is reduced and to down shift the transmission and increase the engine speed when the load is reapplied.

2. Description of Related Art

It has been known in work vehicles to provide automatic transmissions with load control to automatically down shift the transmission when the load is increased and to up shift the transmission and reduce the engine speed when the load is reduced to optimize fuel economy.

The present invention improves upon the prior art by providing a means for the operator to select between manual or automatic engine speed control and to select among multiple automatic modes each having a different amount by which the engine speed is reduced when the load is reduced. This enables the operator to match the degree of engine speed reduction to the particular task at hand for improved performance and productivity. In a minimal speed reduction mode, the light load engine speed is only slightly less than the full load speed. However, if the PTO is on, the engine speed will remain at the rated engine speed to provide a constant PTO output speed regardless of the load. This mode is useful when it is necessary to keep the engine speed high regardless of the load, such as when the PTO is operating.

An intermediate speed reduction mode allows for a speed reduction between 62 and 86 percent of the rated engine speed. This mode is useful while doing heavy draft work to enable the engine speed to be reduced at the end of a row but to still maintain sufficient engine speed for other vehicle systems such as the hydraulic system. A maximum speed reduction mode enables the engine speed to be reduced to 57 to 81 percent of the rated engine speed. This mode is useful for light load applications such as transport and hauling operations where the engine speed can be reduced significantly without reducing the vehicle performance. The particular degree to which the engine speed is reduced is set for each mode with the particular speed being set by the vehicle manufacturer. In each mode, the amount of engine speed reduction is proportional to the amount of the load reduction. The speed setting may be changed to customize the speed settings for a given vehicle. Vehicle service facilities can be equipped with the tools to reprogram the electronic controller for the transmission and the engine. In the context of an agricultural tractor, the speeds can be customized to best suit the practices of a given farm.

DESCRIPTION OF THE PREFERRED EMBODIMENT

Figure 1:
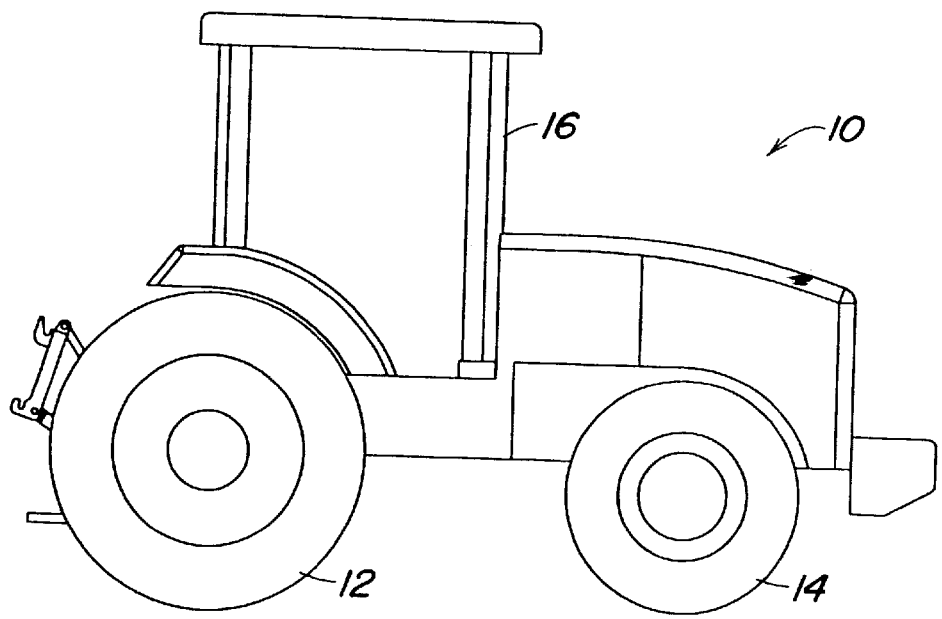
FIG. 1 is a side view of a representative work vehicle, in this case an agricultural tractor.
Figure 2:
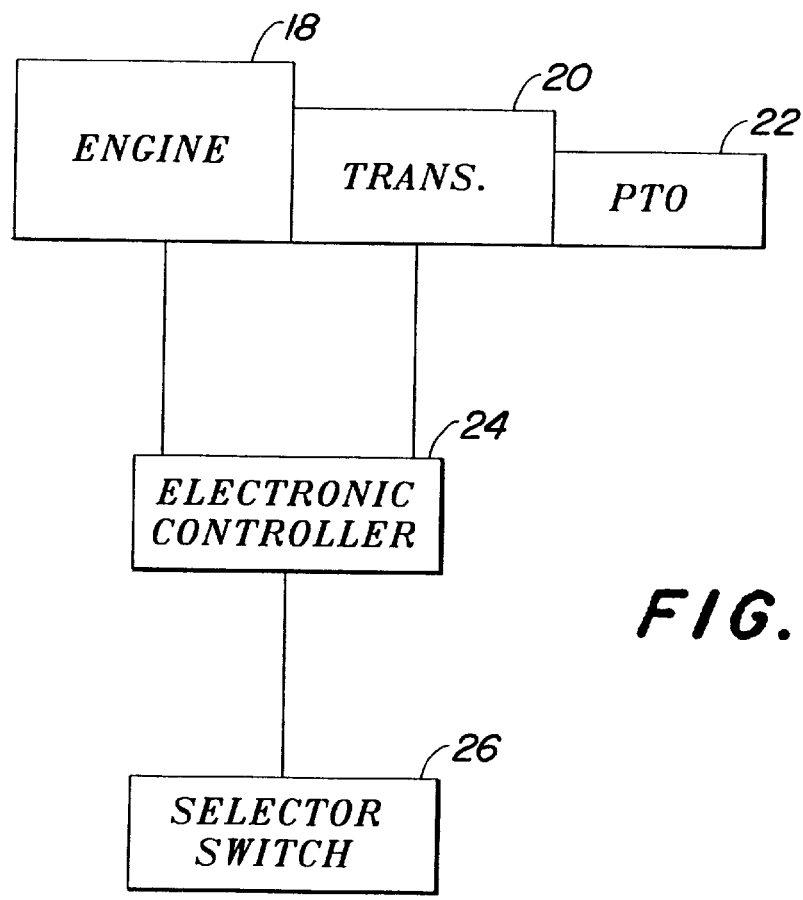
FIG. 2 is a schematic diagram of the tractor power train including the electronic controller and the selector switch of the present invention.

A work vehicle in the form of an agricultural tractor 10 is shown in FIG. 1. The tractor 10 has a pair of rear wheels 12 and front wheels 14. The rear wheels, and possibly the front wheels, are driven wheels. Tracks can be used in place of the wheels. The tractor 10 includes an operator's cab 16 containing a seat for an operator and vehicle controls in a known manner. The tractor 10 further includes an engine 18 and a transmission 20 having a power take off, (PTO) 22.

The transmission 20 drives the tractor wheels 12. An electronic controller 24 coordinates control of both the engine and the transmission. A mode selector switch 26 in the cab 16 allows the operator to select between manual mode and automatic mode engine speed control. In the manual mode, the engine speed is maintained at an operator-selected level. In the automatic mode, the controller will automatically up-shift the transmission and reduce the engine speed to maintain the desired vehicle speed and reduce fuel consumption when the load is reduced. The controller will down shift the transmission and increase the engine speed when the load is reapplied.

In a preferred embodiment, the mode selector switch 26 is a multiple position switch having four positions. One position designates the manual mode while the other three positions each correspond to one of three different automatic modes, each having a different amount by which the transmission is up shifted and the engine speed is reduced when the load is reduced. The three different automatic modes include a minimum engine speed reduction mode, an intermediate engine speed reduction mode and a maximum engine speed reduction mode. Depending on the task at hand, the operator can select which of the three automatic modes to use. In the minimum speed reduction mode, the engine speed is only slightly reduced from the rated speed by as much as 5 percent only when the PTO is not engaged. In this mode, when the PTO is engaged, the engine speed is maintained at the rated speed to provide a constant PTO speed regardless of the load.

At the intermediate speed reduction mode, the engine speed is reduced to a speed within a range of 62 to 86 percent of the rated speed. This mode is useful when doing heavy draft work where it is desirable to reduce engine speed at the end of the row but sufficient engine speed is still necessary for providing adequate hydraulic flow.

In the maximum speed reduction mode, the engine speed is reduced to within the range of 57 to 81 percent of the rated engine speed. This mode is useful for light load applications such as transport and hauling operations.

The various speeds are shown in the following example. A tractor may have a rated engine speed of 2000–2100 rpm and a rated PTO speed of 1000 rpm at the rated engine speed. The minimum speed reduction mode may allow for a 100 rpm reduction, a 5 percent reduction from the rated engine speed, for a light load when the PTO is off. The engine speed is maintained at the rated 2000–2100 rpm range when the PTO is engaged, thereby ensuring a constant PTO speed regardless of the load. In the intermediate speed reduction mode, the light load engine speed is in the range of 1800 to 1400 rpm, approximately 86 to 62 percent of the rated engine speed. In the maximum speed reduction mode, the light load engine speed is in the range of 1700 to 1200 rpm, approximately 81 to 57 percent of the rated engine speed.

In any automatic mode, the amount by which the engine speed is reduced is proportional to the load reduction. The speed reductions described above are the maximum engine speed reductions for a given mode. If the load is only partially reduced, the engine speed will only be partially reduced as well. For example, if the maximum engine speed reduction is selected, and the load is only partially reduced, the engine speed may only be reduced to 1800 rpm instead of reduced to 1140 rpm.

The speed reduction in each of the three automatic modes is set in the electronic controller 24. The speed can be reprogrammed by use of a computer 28 connected to the controller 24 via a releasable coupling 30.

In a preferred embodiment, the transmission is an infinitely variable transmission in which the transmission is capable of being infinitely adjusted instead of being shifted to discrete gear ratios. This enables the particular speeds to which the engine is reduced to be adjustable or customized for a given operation. The four-position switch provides a simple and easy to use control that can be easily switched from one selection to another. Alternatively, the four-position switch can be replaced with a potentiometer that provides for infinitely variable adjustment of the engine speed reduction.

As an alternative to a multiple position selector switch with multiple automatic mode selection, a potentiometer may be used to allow the operator to dial in a specific speed setting. A potentiometer allows the operator to have infinite control but loses the simplicity of a switch with a small number of preset speed reductions.

The invention should not be limited to the above-described embodiment, but should be limited solely by the claims that follow.

We claim:

1. A work vehicle comprising:
   an engine having a rated engine speed;
   a transmission having multiple gear ratios driven by the engine;
   an electronic controller for both the engine and the transmission; and
   a mode selector actuatable by an operator for inputting to the controller an operator selection between manual mode and automatic mode engine speed control wherein in manual mode the engine speed is maintained at an operator selected level and in automatic mode the controller will automatically up-shift the transmission and reduce engine speed to maintain a desired vehicle speed and reduce fuel consumption when a load on the vehicle is reduced and to down-shift the transmission and increase engine speed when the load is subsequently reapplied.

2. The work vehicle as defined by claim 1 wherein the mode selector actuatable by an operator for inputting to the controller includes a multiple position selector switch.

3. The work vehicle as defined by claim 1 further comprising multiple automatic modes selectable by the operator via the mode selector, each automatic mode having different amounts by which the transmission is up-shifted and the engine speed is reduced when the load is reapplied.

4. The work vehicle as defined by claim 3 wherein there are three automatic modes, a minimum engine speed reduction mode, an intermediate engine speed reduction mode and a maximum engine speed reduction mode.

5. The work vehicle as defined by claim 4 wherein in the minimum engine speed reduction mode the engine speed is reduced to a speed not less than 95% of the rated engine speed.

6. The work vehicle as defined by claim 4 wherein in the intermediate engine speed reduction mode the engine speed is reduced to a speed between 62% and 86% of the rated engine speed.

7. The work vehicle as defined by claim 4 wherein in the maximum engine speed reduction mode the engine speed is reduced to a speed between 57% and 81% of the rated engine speed.

8. The work vehicle as defined by claim 3 further comprising a transmission driven PTO and wherein in one automatic mode the engine speed is not reduced when the load is reduced when the PTO is operating whereby the PTO speed remains constant regardless of the load.

9. The work vehicle as defined by claim 3 wherein the rated engine speed is approximately 2000–2100 rpm, and in one automatic mode, when the load is reduced, the engine speed is reduced by approximately 100 rpm.

10. The work vehicle as defined by claim 3 wherein the rated engine speed is approximately 2000–2100 rpm, and in one automatic mode, when the load is reduced, the maximum engine speed reduction is to between approximately 1320 rpm and 1800 rpm.

11. The work vehicle as defined by claim 3 wherein the rated engine speed is approximately 2000–2100 rpm, and in one automatic mode, when the load is reduced, the maximum engine speed reduction is to between approximately 1140 rpm and 1400 rpm.

12. The work vehicle as defined by claim 1 wherein the speed reduction for the automatic mode can be customized for a given vehicle within a predetermined speed reduction range.

13. The work vehicle as defined by claim 1 wherein the transmission is an infinitely variable transmission.

14. The work vehicle as defined by claim 1 wherein the extent of engine speed reduction is proportional to the extent of the load reduction.

15. A work vehicle having:
   an engine;
   a transmission driven by the engine;
   an electronic transmission and engine speed controller in communication with the engine and transmission;
   a multiple position operator actuated selector switch having four positions, one position designating a manual mode while the other three positions each designate one of three different automatic modes, the three different automatic modes comprising a minimum engine speed reduction mode, an intermediate engine speed reduction mode and a maximum engine speed reduction mode, wherein in the automatic mode, the electronic controller will automatically up shift the transmission and reduce engine speed to maintain a desired vehicle speed and reduce fuel consumption when a load on the vehicle is reduced and to down shift the transmission and increase engine speed when the load is reapplied, each mode having a different amount by which the transmission is up shifted and the engine speed is reduced when the load is reduced, the amount of reduction for each mode being:
      in the minimum engine speed reduction mode 95 to 100 percent of the rated engine speed;
      in the intermediate engine speed reduction mode 62 to 86 percent of the rated engine speed;
      in the maximum engine speed reduction mode 57 to 81 percent of the rated engine speed;

wherein the reduction in each mode is proportional to the amount of the load reduction and the speed reduction in each of the three automatic modes is set in the electronic controller, which speed can be reprogrammed by use of a computer connected to the controller via a releasable coupling.

16. A work vehicle as described in claim 15 having a Power Take-off (PTO) driven by the transmission and wherein if the PTO is on, the engine speed will remain at a rated engine speed to provide a constant PTO output speed regardless of the load.

17. A work vehicle as described in claim 15 wherein the transmission is an infinitely variable transmission.

* * * * *